May 7, 1963 E. M. VOORHEES 3,088,354
DOUGHNUT CUTTER AND DEPOSITOR
Filed May 9, 1958 3 Sheets-Sheet 1
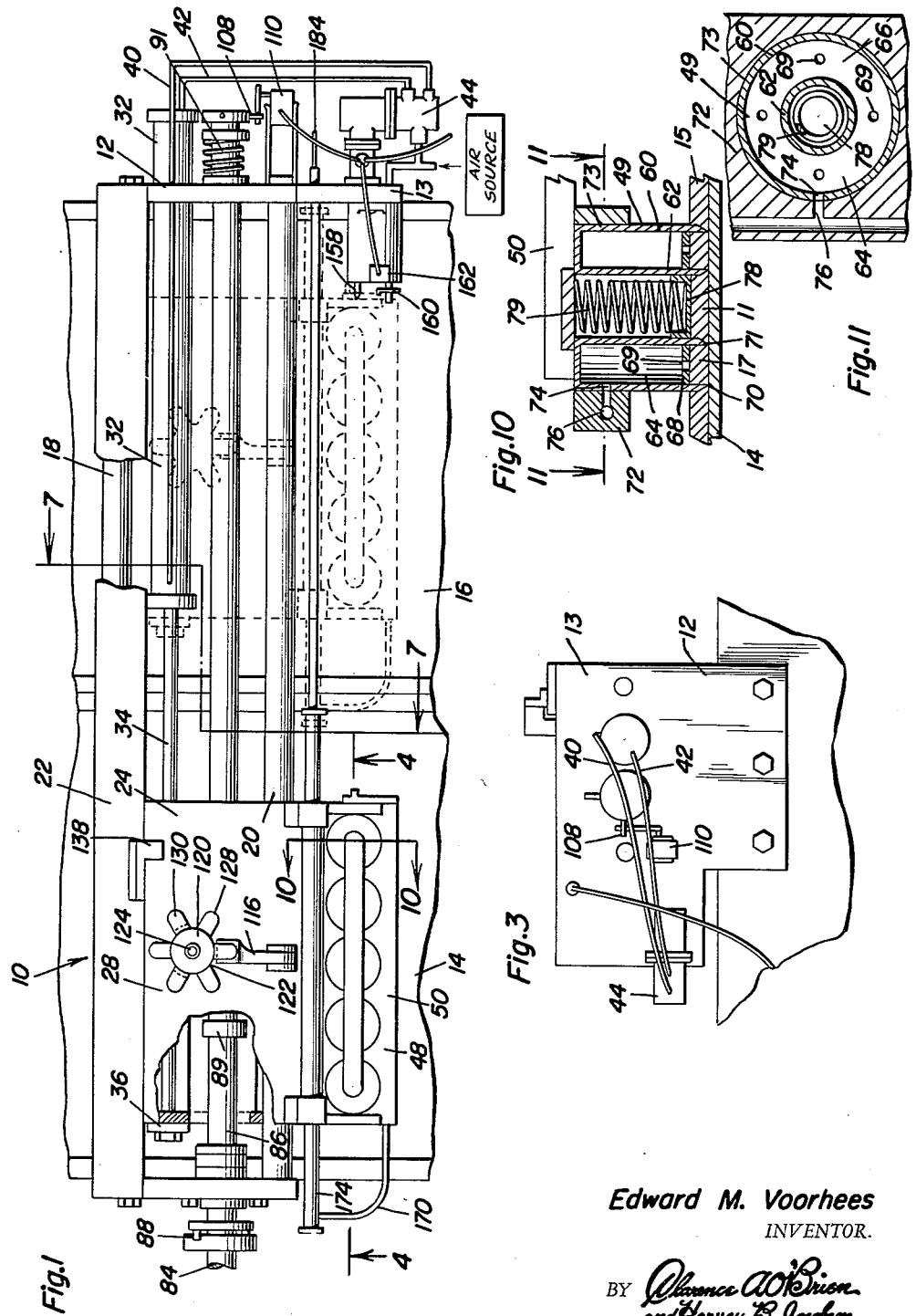
Edward M. Voorhees
INVENTOR.

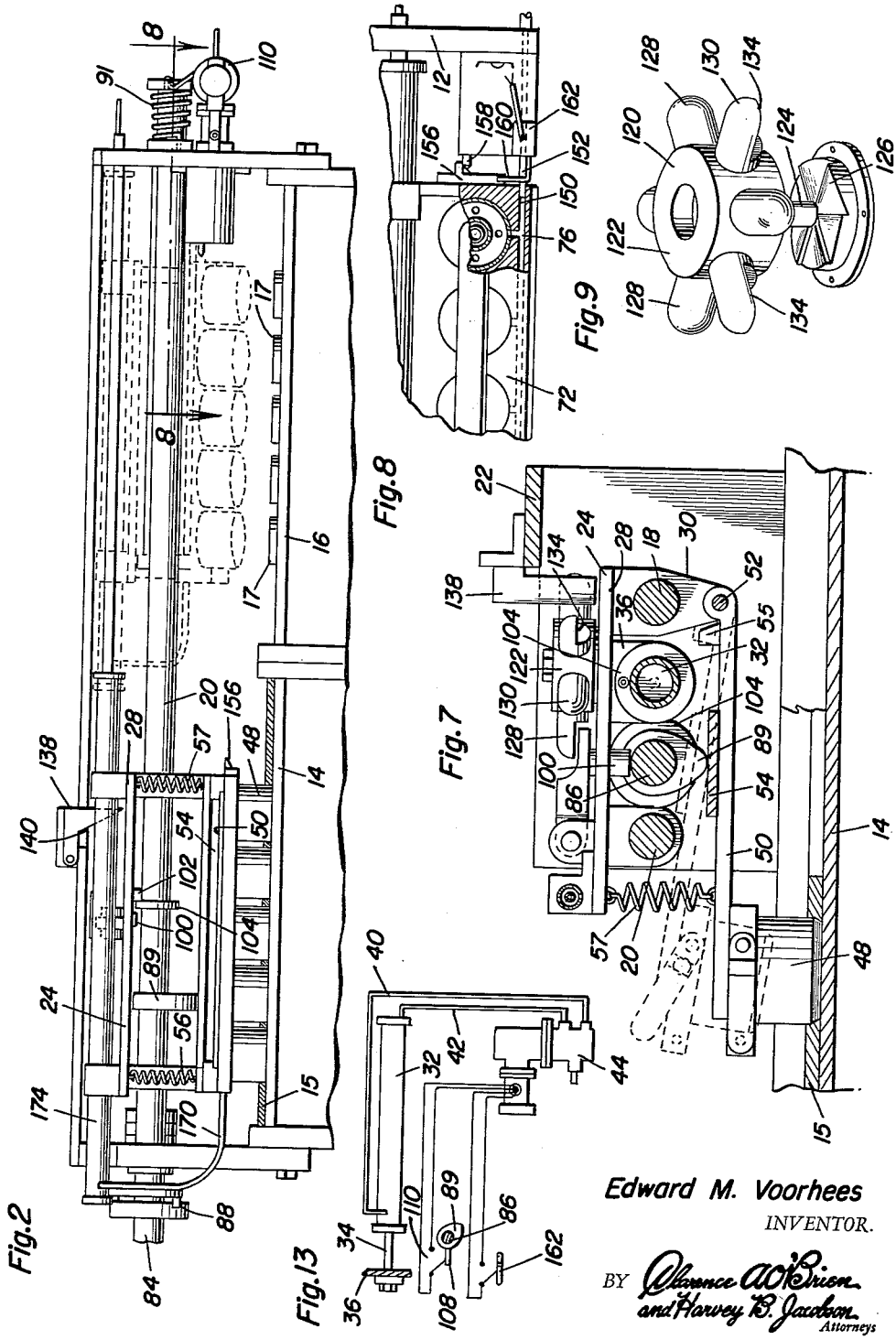

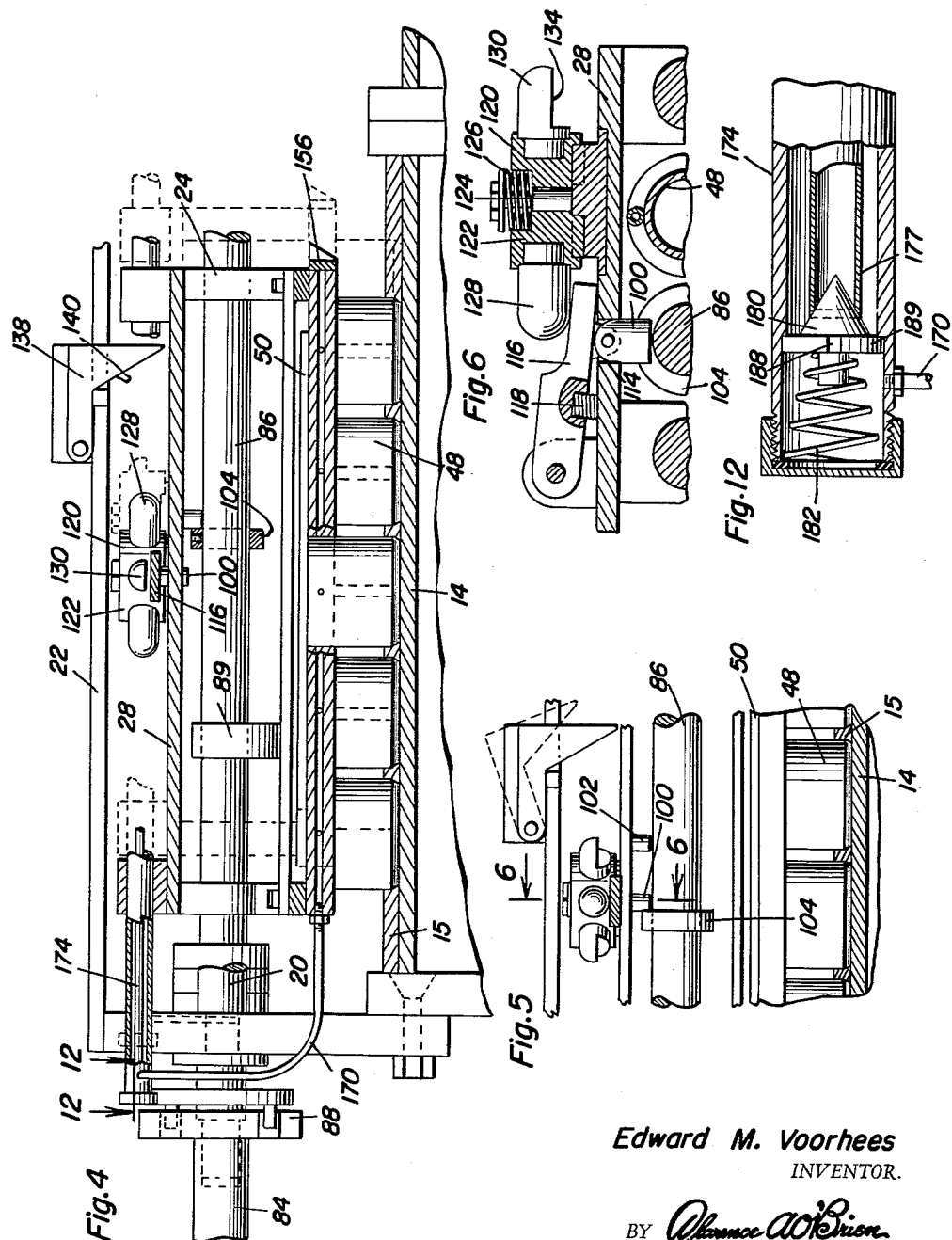

United States Patent Office 3,088,354
Patented May 7, 1963

3,088,354
DOUGHNUT CUTTER AND DEPOSITOR
Edward M. Voorhees, De Land, Fla., assignor, by mesne assignments, of one-fourth to Edward M. Voorhees, De Land, Fla., one-fourth to Ignatius C. Capdeville, Gretna, La., one-fourth to Clarence M. Funk, Greensboro, N.C., and one-fourth to Lawrence L. Mullins, New Orleans, La.
Filed May 9, 1958, Ser. No. 734,267
17 Claims. (Cl. 83—98)

This invention relates to bakery equipment and more particularly to a machine for cutting discrete sections from a strip of dough.

This invention is concerned with a machine for cutting rings of yeast raised dough from a continuous strip that is travelling on a conveyor, transporting the dough rings to a precise position above a second conveyor that is either a continuous belt of screen material or individual screens for proofing and frying, and then depositing the rings of dough upon the surface of the second conveyor. The placement of the rings upon the second conveyor is so accurately accomplished that no shifting of the position of the dough rings is later required to prepare the dough for frying in the process of producing doughnuts. Moreover, the cutting action is so adjusted that the portions of dough cut out to form the doughnut holes are left as scrap dough on the first conveyor, and the return of the cutter is arrested at a position designed to make alternate cuts in a staggered pattern thereby minimizing scrap and conserving dough.

In this machine the rings of dough are cut by means of a downward thrust of a group of cutters. The dough rings are retained within the cutters by vacuum and then after having been transported to the new location above the second conveyor, the dough rings are released and stripped by air under pressure. This action is synchronized with the intermittent motion of the conveyors by means of separate speed controls on each conveyor. The cutting function can be regulated with respect to the dough conservation and the depositing function with respect to the proper placement upon the conveyor belt or frying screens.

One very important feature of this invention is that it makes possible in a high speed automatic machine the production of circular, yeast raised, doughnut rings from sheeted dough (as contrasted to extruded dough) and also the mechanical placement of the cut dough rings upon the frying screens or upon a conveyor for subsequent delivery to the frying equipment. In the trade at the present time at least some of these operations are ordinarily accomplished by using hand labor.

An object of this invention is to provide a reliable, practical high speed machine for cutting dough rings from a continuous strip or sheet of yeast raised dough and for depositing them in a minimum area on another supporting surface and in condition for subsequent frying.

A further object of the invention is to provide such a machine with a novel mechanical movement combining available electrically operated valves in a pneumatic system for dispatching a carriage between dough ring cutting and ejecting positions. Simultaneous with the carriage movement other operations take place: a group of cutters that are pivotally carried by the carriage move to the dough cutting position while the carriage is at the previously mentioned cutting position and synchronized at the proper movement during the movement of the cutters, a chamber in the cutters is partially evacuated thereby drawing a vacuum in the cutters and supporting the dough rings. This support is maintained while the carriage is moved from the cutting position to the dough ring ejection position. Further mechanical functions cause the vacuum to be vented when the carriage is in the ejecting position and close off the suction source while the chamber is subjected to pressure thereby pneumatically stripping the cutters of the dough rings.

In the operation of the carriage it moves between the cutting and ejecting positions. The carriage ejects the dough rings in a perfect line, row after row with proper spacing. By conveyor speed control, the spacing can be altered. However, the cutting positions are sequentially selected so that the rings are cut from the dough in staggered positions. As a result, there will be an economy of dough by reducing waste in the dough strip. The selection of cutting positions is automatically made by a stroke controlling mechanism including a stop that is fixed on the carriage and a second stop that is adjustably carried by the carriage. A stage selector wheel having a plurality of arms of different design, is rotated through an arc each time the carriage approaches the cutting position. Rotation of this wheel depresses the movable stop every cycle of carriage operation and every other movement of the wheel brings a particular type of arm (which operates the adjustable stop) into engagement with a lever which supports the movable stop. Therefore this movable stop is sequentially operated. The position of the movable stop is directly responsible for the place in the travel of the carriage at which the carriage will stop thereby terminating the carriage motion and establishing one of the selected cutting positions of the carriage. The structural organization for achieving this is considered new and provides a very reliable and trouble free way of arresting the motion of the carriage at the end of its movement in one direction and forming one of two possible cutting positions for the carriage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top view of a machine in accordance with the invention.

FIGURE 2 is an elevational view of the machine in FIGURE 1.

FIGURE 3 is an end view of the machine in FIGURE 1.

FIGURE 4 is an enlarged sectional view through the cutters and taken on the line 4—4 of FIGURE 1.

FIGURE 5 is a fragmentary sectional and elevational view showing one of the stops in engagement with the cam shaft of the machine, this establishing one of the two ejecting positions of the carriage.

FIGURE 6 is an enlarged sectional view taken on the line 6—6 of FIGURE 5.

FIGURE 7 is a transverse sectional view taken on the line 7—7 of FIGURE 1.

FIGURE 8 is a fragmentary view showing the carriage in the cutting position and showing particularly the means for drawing a vacuum on the cutters to hold the dough rings in the cutters.

FIGURE 9 is an exploded perspective view of a detail of construction.

FIGURE 10 is a sectional view in enlarged scale showing one of the cutters and the air manifold associated with the chamber of the cutter.

FIGURE 11 is a transverse sectional view taken on the line 11—11 of FIGURE 10.

FIGURE 12 is an enlarged sectional view of a valve and taken on the line 12—12 of FIGURE 4.

FIGURE 13 is a schematic view showing the cylinder for actuating the carriage and a part of the carriage and a part of the electrical control circuit for the pneumatic dispatch system associated with the carriage moving cylinder.

In the accompanying drawings there is a machine 10 that has a frame 12 with a structure over two conveyors, the first supply conveyor 14 adapted to support a continuous strip or sheet of dough 15, and the second delivery conveyor 16 adapted to receive the discrete parts, e.g., rings 17 of the dough that are cut from the strip 15 on conveyor 14 as seen in FIGURE 2. Conveyor 16 may have screens thereon since the machine is capable of depositing the cut dough in precise and exact position without requiring that the dough be adjusted or moved preparatory to frying. From the foregoing, it will be understood that the intermittent feeding of the continuous sheet of dough 15 by the conveyor 14 for spacing of the dough rings cut therefrom, may be varied by a suitable speed control drive for the conveyor 14 as hereinbefore mentioned.

Although the machine is especially useful in cutting yeast raised dough from a continuous strip for doughnut frying, other shapes may be cut and the compositions of the dough can be varied without in any way affecting the operation of the machine.

The frame 12 has sides on which two rails 18 and 20 are fixed. These rails can have any cross section, for example they may be circular in section as shown in FIGURE 7. The rails are fixed as is the upper cross member 22 of frame 12 which extends parallel to the rails but which is slightly higher than the rails. Carriage 24 is mounted on the rails and is adapted to traverse them between a single ejecting position shown in dotted lines in FIGURE 1, and one of a pair of cutting positions when overlying the supply conveyor 14. One of the cutting positions is shown by the carriage 24 in FIGURE 1 and the other cutting position is to have the carriage slightly displaced therefrom on the rails 18 and 20. The carriage has a main carriage plate 28 from which brackets 30 depend. These brackets have openings through which rails 18 and 20 are passed. This mounts the carriage on the rails and constrains the motion of the carriage to one plane.

The means for moving the carriage between the positions are automatically operated. They consist of a cylinder 32 that is attached at its cylindrical portion to a side of frame 12 and that has its piston rod 34 secured to a bracket 36 (FIGURE 7) that depends from carriage plate 28. The fastening may be achieved in any way such as by having the piston rod 34 threaded and passed through a hole in bracket 36 and fastened in place by a nut. It is preferred that the cylinder 32 be pneumatically operated and double acting. One air line 40 is connected to the cylinder near its inner end while the other air line 42 is connected to the cylinder at its outer end. Both air lines are secured to a solenoid operated air control valve 44 that is fastened to a plate 13 on one side of frame 12. Air from a source of air under pressure is controlled by valve 44 for alternate application to opposite ends of the piston in the cylinder 32 thereby reciprocating the carriage 24 on its rails.

A group 48 of cylindrical cutters are secured to a cutter support 50 (FIGURE 7) which is pivoted by spindle 52 to the depending brackets 30 at the back of the carriage. Support 50 is preferably a frame or plate and has a cam wear plate 54 on its top surface and intermediate the front and rear ends thereof. Stop 55 attached to the support 50 is adapted to contact one of the brackets 30 to limit the extent of upward motion of the support 50. The stop is ordinarily engaged with the depending bracket 30 since the support 50 is held in the elevated position by a pair of springs 56 and 57 that are secured to the carriage plate 28 and support 50. The yielding bias of the springs 56 and 57 is overcome when the cutters 48 are moved downward toward the conveyors 14 and 16.

Each cutter, for example typical cutter 49 (FIGURES 10 and 11) consists of a cylinder 60 with a concentric inner cylinder 62 spaced therefrom to form a chamber 64. An equalizer plate 66 having a plurality of ports 69, is in the lower part of the inner and outer cylinder and spaced inwardly from the sharp cutting edges 70 and 71 of each cylinder. Each of the cutters is attached to the front part of support 50. A manifold 72 is also attached to support 50 and has a plurality of spaced openings 73. One cutter is in each of these spaced openings, and each cutter has a port 74 in the side wall of the outer cylinder that is registered with the air passageways 76 of manifold 72. Accordingly, chamber 64 of each cylinder can have either suction or pressure applied thereto through the same manifold. A pusher 78 is mounted in the inner cylinder 62 with a spring 79 attached to the pusher and the support 50 to eject the center part 11 of the dough 15 that is cut by the cutter, leaving the center part on the conveyor 14 while the ring 17 of the dough is retained in the cutter.

Assuming the carriage 24 to start at the ejecting position above conveyor 16, the next step is to have the carriage move by cylinder 32, to one of the two possible cutting positions over conveyor 14. There are two cutting positions so that the rings of dough are cut in staggered relationship to conserve dough in the strip 15. Driven shaft 84 is drivingly connected to cam shaft 86 by clutch 88. The cam shaft is mounted for oscillation in the sides of the frame and has a cam 89 (FIGURE 7) thereon. The cam is adapted to abut plate 54 when the cam shaft 86 is rotationally moved thereby depressing the cutters 48 (FIGURE 7) against the yielding opposition of springs 56 and 57. There is end play in shaft 86 and this is how the clutch 88 is engaged and disengaged thereby driving or uncoupling shaft 86. As far as rotation of shaft 86 is concerned, there is a limit established by a torsion spring 91 that has one end anchored to a collar on the end of shaft 86 and the other end anchored to a part of the frame. When clutch 88 is engaged, cam shaft 86 is rotated less than one revolution and the clutch 88 is disengaged permitting spring 91 to return the cam shaft to the original position.

In moving to the cutting position, the carriage has one of two stops 100 and 102 (FIGURE 2) engage a collar 104 that is adjustably fixed on a cam shaft 86. Retractible stop 100, if raised, will clear the stop 104 requiring the fixed abutment 102 to abut the collar 104 thereby axially moving the shaft 86 and engaging the clutch 88. If stop 100 is depressed, it will not clear collar 104, and therefore, it will strike that collar and move shaft 86 axially to engage clutch 88. As soon as the cam shaft 86 begins to rotate, finger 108 (right side of FIGURE 1) begins to rotate with it because it is attached by a collar to the cam shaft 86. This operates a switch 110 that is wired in circuit with the valve 44 causing the valve to reverse the flow of air under pressure into the double acting cylinder 32. Immediately the carriage stops and begins to move in the opposite direction. But meanwhile cam 89 has depressed the cutters 48 and the dough rings 17 have been cut from the dough 15 on the conveyor 14.

It is now evident that by programmed movement of the carriage it can stop in different cutting positions depending on whether retractible stop 100 is raised or lowered. As a result thereof, the linear spacing on the continuous dough strip 15 for the ring cuts, may be reduced to a distance less than the ring diameters, so as to achieve a reduction in dough scrap. In order to operate the retractible stop 100, it is passed through an opening 114 (FIGURE 6) in the carriage plate 28 and is pivoted to a lever 116. This lever is pivoted to carriage plate 28 and is biased by spring 118 to an elevated position which would raise stop 100. Selector 120 is mounted on carriage plate 28 and consists of a wheel 122 mounted for rotation on a vertical spindle 124. A ratchet clutch 126 is operatively connected with the wheel so that the wheel can rotate only in one direction and will move only a predetermined increment of motion. A plurality of radial arms such as arms 128 and 130 are carried by the wheel 122. Every alternate arm has a flat 134 on its bottom surface with the other arms cylindrical. The flat 134 provides clearance enabling spring 118 to elevate the lever 116 sufficiently to withdraw stop 100 from the path of travel of collar 104. But, when an arm 128 is above lever 116, it will depress the lever a sufficient distance to locate the adjustable stop in the path of travel of collar 104.

Abutment 138 is mounted on member 22 of frame 12 and has a cam surface 140 on one side thereof. When the carriage is being moved from the cutting position to the ejecting position, the cam surface 140 rides over the arms 128 and 130 causing no movement of the selector 120. However, when the carriage is moving from the ejecting position to the cutting position, the abutment 138 is struck by one of the arms and this causes the selector to ratchet one position bringing a new arm 128 or 130 over the top of lever 116 and either releasing or pushing stop 100 to its new position.

When the carriage is in the ejecting position, the passageways 76 of air manifold 72 are subjected to air under pressure. Port 150 (FIGURE 8) is at one end of the manifold 72 and registers with the passageways 76. Air under pressure from an external source is applied by air nozzle 152 which enters into port 150. The nozzle has a spring loaded check valve which opens when the carriage moves to such position that the end of the nozzle penetrates port 150 as shown in FIGURE 8. However, in order to enter the port 150 and to vent the manifold and cutter of residual suction, a pivoted closure 156 that ordinarily covers port 150 to retain the vacuum in manifold 72, is opened by contacting the pilot 158 which is fixed to one end of the frame 12. At the same time closure 156 actuates a switch operator 160 of switch 162. Switch 162 is wired in circuit with the main control valve 44 and again reverses the flow of air under pressure in line 42 and 40 thereby causing the carriage to start moving in the opposite direction, that is toward the cutting position. Pivoted closure 156 is automatically gravity closed as soon as the carriage begins to move toward the conveyor 16, after the connection between the air under pressure and the manifold is severed so that the vacuum may be reestablished. However, the blast of air in the manifold 72 is sufficient to strip the dough rings from the cutters and deposit them on the frying screens on conveyor 16 prior to return movement of the carriage to a cutting position or directly on the conveyor 16.

Manifold 72 has a conductor 170 at the end opposite closure 156. It attaches to a telescoping tube 174 having one end of an outer section fixed to frame 12 and having another inner section secured to the carriage (FIGURE 4). When the carriage is in the ejecting position, one end 177 (FIGURE 12) of the smaller diameter section of tube assembly 174 is engaged by the spring loaded valve 180 in the larger diameter section of the telescoping tube assembly. A light spring 182 keeps the valve seated in end 177 of the smaller diameter section. This is so that the ejecting application to the cutters through port 150 as hereinbefore indicated can build up to a sufficient level to strip the cutters. But, when the carriage moves to the cutting position over conveyor 14, the manifold is exposed to a suction which is applied from a vacuum source to an end of the inner telescoping tube section opposite end 177 as shown in FIGURE 2. The suction is transmitted through the sections of telescoping tube 174, through the opening 188 in the collar 189 of valve 180, and then through conductor 170 for suction application to the manifold and hence, the chamber 64 of the individual cutters. Accordingly, when the cutters are moved into the cutting portion of a cycle of operation, the vacuum in manifold 72 will hold the dough rings in the cutters, rendered effective by opening of valve 180 and remains effective until broken by venting the manifold in the manner described previously followed by simultaneously closing of valve 180 and pressurization of manifold 72.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications nad equivalents may be resorted to, falling within the scope of the invention as claimed.

What is claimed as new is as follows:

1. A machine to cut rings of dough from a continuous strip while the strip is traveling on a conveyor, said machine comprising a frame, a carriage carried by said frame and movable from a cutting position overlying a dough strip to a dough ring unloading position, a group of cutters movably mounted on said carriage and adapted to cut rings of dough from the dough strip on the conveyor, means connected with said frame for moving said carriage between the cutting position and a selected dough ring ejecting position, a dough ring receiving surface adjacent to said conveyor, means carried by said frame for moving said cutters toward said conveyor and into the strip of dough thereon when said carriage is in said cutting position, said cutters having a chamber therein, means for applying suction into said chamber when said carriage is in the cutting position to hold the dough rings in said cutters, means operable in response to movement of said carriage to the ejecting position for applying pressure to said chamber to eject the dough rings onto said surface, means mounted on the frame, stroke control means cooperating with said frame mounted means and carried by said carriage for alternatively limiting the movement of said carriage to different positions and thereby selecting said cutting position whereby the cut dough rings may be staggered in successive cutting positions.

2. In a machine to cut dough rings from a continuous strip of dough, said machine comprising a frame, a carriage, a first conveyor to support the strip of dough, a second conveyor beneath said frame to receive the dough rings, said frame having a pair of rails over both of said conveyors and on which said carriage is disposed to move between a selected cutting position overlying the dough strip and a dough ring ejecting position means on the carriage for retaining and ejecting dough in said selected cutting and ejecting positions respectively, a cylinder connected to said frame and said carriage to move said carriage, stroke control means mounted on the carriage, frame mounted means cooperating with the stroke control means for alternately limiting the movement of the carriage to a different selected cutting position, a group of cutters adapted to cut rings of dough from the dough strip, means including a support pivotally mounting said cutters on said carriage for movement toward and from said conveyors, a camshaft carried by said frame, a cam on said camshaft and contacting said support to pivotally actuate said support and cutters toward said conveyors when said carriage is in said selected cutting position, yielding means attached to said carriage and said support to return said cutters form the conveyors after being moved by said cam, and means responsive to rotation of said camshaft for actuating said cylinder in one direction.

3. In a machine to cut dough rings from a continuous strip of dough, said machine comprising a frame, a carriage, a first conveyor to support the strip of dough, a second conveyor beneath said frame to receive the dough rings, said frame having a pair of rails over both of said conveyors and on which said carriage is disposed to move between a selected cutting position overlying the dough strip and a dough ring ejecting position, a cylinder connected to said frame and said carriage to move said carriage, a group of cutters adapted to cut rings of dough from the dough strip, means including a support pivotally mounting said cutters on said carriage for movement toward and from said conveyors, a camshaft carried by said frame, a cam on said camshaft and contacting said support to pivotally actuate said support and cutters toward said conveyors when said carriage is in said selected cutting position, yielding means attached to said carriage and said support to return said cutters from the conveyors after being moved by said cam, means responsive to rotation of said camshaft for actuating said cylinder in one direction, carriage actuated means for actuating said cylinder in the opposite direction, said camshaft mounted for rotation and axial movement on said frame, a drive shaft having a clutch operatively connected to said camshaft, and stroke control means carried by said carriage to engage said camshaft in response to movement of said carriage to the cutting position for axially moving said camshaft to engage said clutch and thereby rotate said camshaft.

4. In a machine to cut dough rings from a continuous strip of dough, said machine comprising a frame, a carriage, a first conveyor to support the strip of dough, a second conveyor beneath said frame to receive the dough rings, said frame having a pair of rails over both of said conveyors and on which said carriage is disposed to move between a selected cutting position overlying the dough strip and a dough ring ejecting position, a cylinder connected to said frame and said carriage to move said carriage, a group of cutters adapted to cut rings of dough from the dough strip, means including a support pivotally mounting said cutters on said carriage for movement toward and from said conveyors, a camshaft carried by said frame, a cam on said camshaft and contacting said support to pivotally actuate said support and cutters toward said conveyors, yielding means attached to said carriage and said support to return said cutters from the conveyors after being moved by said cam, means responsive to rotation of said camshaft for actuating said cylinder in one direction, carriage actuated means for actuating said cylinder in the opposite direction, said camshaft mounted for rotation and axial movement on said frame, a drive shaft having a clutch operatively connected to said camshaft, stroke control means carried by said carriage to engage said camshaft in response to movement of said carriage to the cutting position for axially moving said camshaft to engage said clutch and thereby rotate said camshaft, said cutters having an air chamber therein, means for drawing a vacuum in said chamber when said carriage is in the cutting position and for maintaining said chamber under the vacuum while said carriage is being moved to the eject position, and means for releasing the vacuum from said chamber when said chamber reaches the eject position and for applying pressure into said chamber thereby expelling the dough rings from said cutters and onto said second conveyor.

5. In a machine to cut dough rings from a continuous strip of dough, said machine comprising a frame, a carriage, a first conveyor to support the strip of dough, a second conveyor beneath said frame to receive the dough rings, said frame having a pair of rails over both of said conveyors and on which said carriage is disposed to move between an ejecting position and a selected dough ring cutting position overlying the dough strip, a cylinder connected to said frame and said carriage to move said carriage, a group of cutters adapted to cut rings of dough from the dough strip, means including a support pivotally mounting said cutters on said carriage for movement toward and from said conveyors, a camshaft carried by said frame, a cam on said camshaft and contacting said support to pivotally actuate said support and cutters toward said conveyors when said carriage is in said selected cutting position, yielding means attached to said carriage and said support to return said cutters from the conveyors after being moved by said cam, means connected with said cylinder to actuate said cylinder and move said carriage between said positions, stroke control means mounted on the carriage, frame mounted means cooperating with the stroke control means for alternately limiting the movement of the carriage to a different selected cutting position, and pneumatic means for applying pressure to said cutters in response to movement to said ejecting position and for drawing a vacuum on said cutter when in the cutting position to respectively retain and eject dough rings.

6. In a machine for cutting discrete parts of a continuous strip of dough, the combination of a frame, a carriage carried by said frame, means for moving said carriage between cutting and eject positions, at least one cutter carried by said carriage and overlying the dough strip when said carriage is in said cutting position, means for moving said cutter with respect to said carriage to the dough cutting position when said carriage is in said cutting position, means for holding the cut dough in said cutter by application of suction to said cutter when said cutter severs a portion of the continuous strip of dough, pneumatic means operatively connected with said cutter for ejecting the cut dough in response to movement of said carriage to the eject position, stop means carried by said carriage and operatively connected with said frame for alternately stopping said carriage in different cutting positions laterally of the dough strip for selectively cutting dough parts from laterally spaced portions of the dough during successive cycles of carriage movement.

7. A doughnut cutter and depositor machine comprising, a frame, a carriage slidably mounted on said frame, means for moving said carriage alternately between one of two cutting positions overlying a strip of dough and a depositing position spaced from said strip of dough, cutter means movably mounted on said carriage operative in response to movement thereof to cut an annular ring from a strip of dough when said carriage is in a cutting position, retaining means operatively connected to the cutter means for retaining only the annular ring of dough therein while continuously rejecting a center portion of the dough ring, ejector means operatively connected to the retaining means for disabling the retaining means and ejecting the annular dough ring from the cutter means in response to movement of the carriage to a depositing position, stroke control means on the carriage engageable with the frame for limiting movement of the carriage to said two cutting positions, and surface means for receiving said annular ring of dough in the depositing position of the carriage.

8. The combination of claim 7, wherein said stroke control means cooperates with means mounted on the frame in response to movement of the carriage for alternately limiting the carriage to one of said two cutting positions.

9. A machine to cut rings of dough from a continuous strip while the strip is controllably traveling on a conveyor, said machine comprising a frame, a carriage carried by said frame and movable from a cutting position overlying the dough strip to a dough ring unloading position, a plurality of cutters adapted to cut rings of dough from the dough strip on the conveyor, means movably mounting said cutters on said carriage for movement of the cutters to a dough cutting position when said carriage is in said cutting position, a dough ring receiving surface near said conveyor and opposing said cutters when said carriage is at the dough ring unloading position, said cutters having chambers therein, means to apply a suction to said chambers when said cutters cut the dough in the dough cutting position and thereby retain the dough rings in said cutters, normally closed means for venting said chambers to relieve the suction when said cutters are opposing said surface, means responsive to movement of the carriage to an unloading position for applying pressure into said chambers to eject the dough rings from said cutters and onto said surface and stroke control means operatively mounted on the carriage and operatively displaceable by said frame in response to movement of the carriage toward a cutting position for longitudinally shifting the carriage along its path of movement to change the stroke of movement thereof.

10. The combination of claim 9, wherein said stroke control means comprises, an abutment element fixedly mounted on said carriage for reversing movement of said carriage from different spaced cutting positions, retractible means mounted on the carriage for movement between an inoperative and operative engaging position to reverse movement of said carriage from one of said spaced cutting positions, and selector means mounted on said carriage for displacement in response to movement of the carriage from the unloading position to render the retractible means operative during selected strokes of movement.

11. The combination of claim 5, wherein said stroke control means comprises, an abutment element fixedly mounted on said carriage and operatively engageable with said cam shaft for reversing movement of said carriage from different spaced cutting positions, retractible means mounted on the carriage for movement between an inoperative and operative engaging position to reverse movement of said carriage from one of said spaced cutting positions, and selector means mounted on said carriage for displacement in response to movement of the carriage from the unloading position to render the retractible means operative during selected strokes of movement.

12. The combination of claim 6, wherein said stroke control means comprises, an abutment element fixedly mounted on said carriage for reversing movement of said carriage from different spaced cutting positions.

13. In a continuous strip of dough cutting machine, a frame, a carriage connected with said frame, means for moving said carriage between cutting and ejecting positions respectively overlying and spaced from a strip of dough, cutters carried by said carriage, means connected with said cutters to move said cutters with respect to said carriage and sever the dough in the cutting positions of the carriage, means mounted on the frame, stroke control means connected with said carriage and cooperating with said frame mounted means for alternately limiting movement of the carriage to different cutting positions during successive cycles of carriage movement, means mounted on the carriage for retaining and ejecting the dough severed by the cutters, and surface means operatively positioned relative to the cutters in the ejecting position of the carriage to receive the dough ejected therefrom.

14. In a continuous strip of dough cutting machine, a frame, a carriage connected with said frame, means for moving said carriage between cutting and ejecting positions respectively overlying and spaced from a strip of dough, cutters carried by said carriage, means connected with said cutters to move said cutters with respect to said carriage and sever the dough in the cutting positions of the carriage, means mounted on the frame, stroke control means connected with said carriage and cooperating with said frame mounted means for alternately limiting movement of the carriage to different cutting positions during successive cycles of carriage movement to cut the dough in a predetermined pattern, pneumatic means connected with said cutters for supporting the cut dough by suction in said cutters when said carriage is in the cutting positions and ejecting said cut dough at the ejecting position, and means for receiving said cut dough from the cutters in the ejecting position of the carriage.

15. The combination of claim 13, wherein said stroke control means comprises, an abutment element fixedly mounted on said carriage for reversing movement of said carraige from different spaced cutting positions.

16. The combination of claim 14, wherein said stroke control means comprises, an abutment element fixedly mounted on said carriage for reversing movement of said carriage from different spaced cutting positions.

17. The combination of claim 14, wherein said stroke control means comprises, an abutment element fixedly mounted on said carriage for reversing movement of said carriage from different spaced cutting positions, retractible means mounted on the carriage for movement between an inoperative and operative engaging position to reverse movement of said carriage from one of said spaced cutting positions, and selector means mounted on said carriage for displacement in response to movement of the carriage from the depositing position to render the retractible means operative during selected strokes of movement.

References Cited in the file of this patent

UNITED STATES PATENTS

| | | |
|---|---|---|
| 516,299 | Curry | Mar. 13, 1894 |
| 966,160 | Brady | Aug. 2, 1910 |
| 1,576,270 | Ganski | Mar. 9, 1926 |
| 1,834,012 | Willoughby | Dec. 1, 1931 |
| 2,095,309 | Brackett et al. | Oct. 12, 1937 |
| 2,125,480 | Avery | Aug. 2, 1938 |
| 2,133,542 | Jensen | Oct. 18, 1938 |
| 2,186,884 | Shomaker | Jan. 9, 1940 |
| 2,283,298 | Thum | May 19, 1942 |
| 2,446,201 | Turner | Aug. 3, 1948 |
| 2,487,271 | Petri | Nov. 8, 1949 |
| 2,665,013 | Socke | Jan. 5, 1954 |
| 2,726,718 | Pfeifle | Dec. 13, 1955 |
| 2,941,341 | Clinton | June 21, 1960 |